United States Patent Office 3,292,978
Patented Dec. 20, 1966

3,292,978
DEVICE FOR CONTROLLING THE HYDRAULIC BRAKING OF THE WHEELS OF A VEHICLE
René Lucien, Neuilly-sur-Seine, France, assignor to Société Recherches Etudes Production R.E.P. S.à.r.l., Paris, France
Filed Oct. 27, 1964, Ser. No. 408,461
Claims priority, application France, Oct. 30, 1963, 952,319, Patent 84,854
2 Claims. (Cl. 303—21)

The present invention relates to a system for controlling the hydraulic braking of a wheeled vehicle.

Devices are known which tend to prevent the locking of the wheels of a vehicle. In these devices, a break-releasing signal is sent to the braking installation when the angular deceleration of the wheel exceeds a pre-determined value. The choice of this value is a difficult problem; if it is too low, the braking distance is increased to an unacceptable extent; if it is too high, there is a risk of locking the wheels when the running conditions are not those which were expected. In fact, when it is desired to reserve sufficient braking capacity for the vehicle, the control device only begins to act when the pneumatic tire has begun to skid. Account must also be taken of the time of response of the control device.

By reason of these difficulties, the known devices are quite frequently only left operative if particular circumstances are expected which greatly aggravate the risk of locking the wheels, so that if the actual conditions are not those which have been expected and which have led to the device being left inoperative, locking of the wheels occurs.

It is an object of the invention to provide an installation by which the wheels of a vehicle are braked under the optimum conditions of efficiency and safety.

It is especially an object of the invention to provide an installation, in accordance with which skidding of the pneumatic tire on the ground or the like is prevented in a sure manner, in spite of the variations of surface conditions. It is also an object of the invention to provide a device for controlling the wheels of a vehicle which is simple to construct and which adapts itself easily to existing braking installations.

It is a further object of the invention to provide a system which can be readily adjusted to the state of the ground and also to the variable conditions which exist during the braking of certain vehicles, such as an aircraft in the course of landing.

According to the invention, the possibilities of braking, that is to say of deceleration of a vehicle on wheels are indicated at instants which can be as close together as may be necessary, by measurement of the acceleration of a wheel of the vehicle or of a feeler wheel specially constructed for that purpose, subjected to a succession of brakings and braking releases. The running-up to speed of a wheel fitted with a pneumatic tire is a function, inter alia, of the coefficient of friction between the tire and the ground and therefore of the state of the ground, and the results of the measurement are utilized in order to put the braking installation into a condition such that the braking pressure cannot reach a value beyond which a wheel would become locked. In addition, decelerometers are provided which, in the event of skidding of a wheel, reduce the braking action and thus prevent the wheel from locking.

It will be observed that the invention permits a substantially constant braking pressure to be applied to the wheels (except for any variation introduced by the operator, and this pressure, if so required, may be constantly very close to the instantaneous value of the adhesion of the tire on the ground and just less than that value.

The invention thus puts the installation at every instant into the condition which is most favorable to braking, making it possible to ensure the desired braking with the required intensity, at the same time giving the certainty that locking of the wheel will not take place. It thus permits the best possible use of the characteristics of an existing braking installation and also enables the best advantage to be taken of the state of the ground on which the vehicle is travelling.

In the case where rapid braking is desired, it permits stopping of the vehicle to be effected within the minimum possible distance and without risk of accidents.

The acceleration of the feeler wheel is advantageously measured in the form of an electric voltage by means of potentiometer devices, and the said voltage is applied to a servo-distributor of the braking fluid so as to limit the maximum pressure at which the braking fluid is admitted to the members provided for braking the wheel.

The invention will be described in relation to applications to aircraft, but it is expressly specified that it is equally well applicable to any vehicle on wheels. These applications to aircraft are concerned, in one case to a friction measuring wheel system specially constructed for that purpose, valid for a single wheel, a diabolo or a bogey, and in the other case to a system without feeler wheel, applicable to a diabolo or bogey.

The invention will be described with reference to the accompanying drawings which are given by way of example and without implied limitation.

Figure 1:
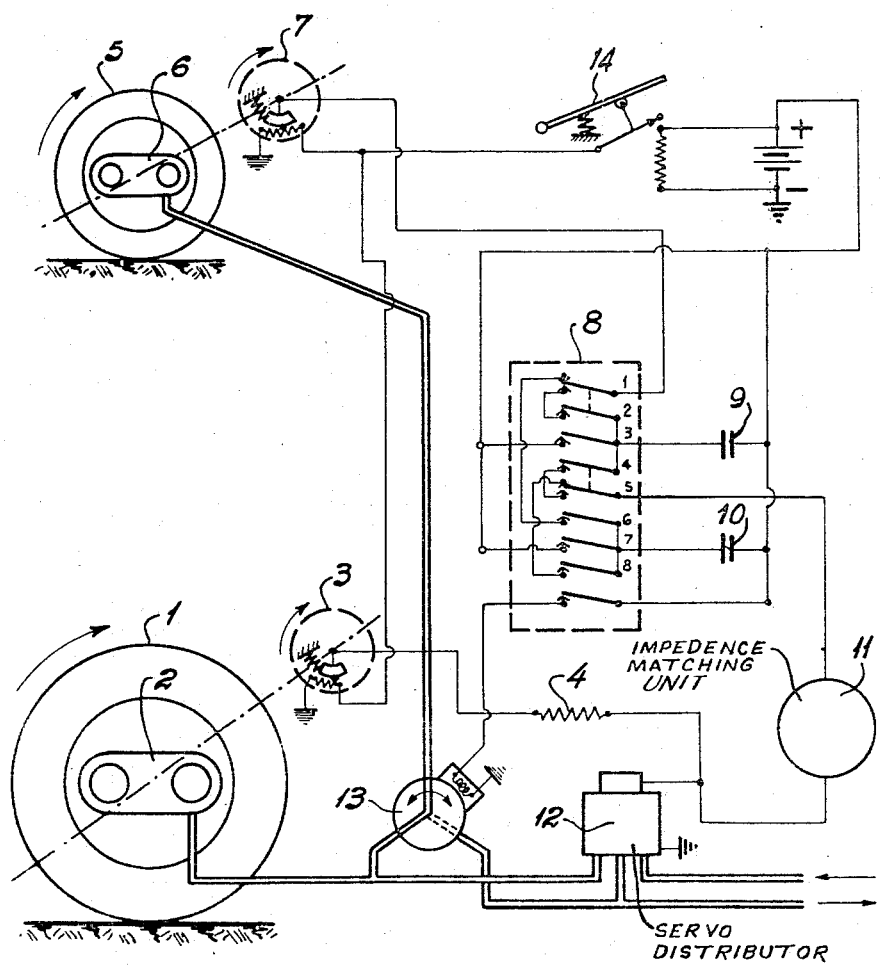
FIG. 1 shows the diagram of a braking system with a friction device.

A system of braking employing a friction measuring device will be described with reference to FIG. 1. This device can be utilized on all types of carrying units with single or multiple wheels, of a vehicle.

It will be observed that for the sequence of measurement of the coefficient of friction between the pneumatic tire and the ground, the system does not utilize the wheel or wheels to be braked, and that it thus makes it possible to obtain on the brake or brakes a continuous and variable braking pressure which is a function of the variations in the value of this coefficient.

This system comprises:

A wheel 1 provided with a pneumatic tire, a hydraulic brake 2, and equipped with a regulation decelerometer 3 with an adjusted resistance 4;

A feeler measuring device 5 constituted by a small friction wheel provided with a pneumatic tire, a brake 6, which may be hydraulic, pneumatic or electro-magnetic, and equipped with a detection accelerometer 7. This feller wheel rolls on the ground in front of the wheel 1. In the case of an aircraft, this feeler wheel can be the front wheel;

A switch unit 8 which may be operated mechanically or electrically;

A group of two memories 9 and 10 constituted by an electric resistance-capacity circuit;

An impedance matching device 11;

An electro-hydraulic servo-distributor 12 delivering a pressure proportional to the current which it receives;

An electro-distributor 13 which, in the case where the brake 6 of the system 5 is hydraulic, enables the brake to be supplied in a periodic manner.

This system operates in the following manner:

In the first place, the portion of the braking control on the pilot side is conventional and will not be described in detail: briefly, the pedal 14 of the brake permits the servo-distributor 12 to be supplied electrically through a potentiometer which, by varying the supply voltage enables a more or less powerful braking to be obtained.

When the pilot depresses the brake pedal 14 with the vehicle running, the feeler wheel 5 is braked and released alternately by virtue of the electro-distributor 13 which is synchronized with the switch unit 8.

When the wheel of the friction measuring device 5 is run-up to speed, the detector 7 measures an acceleration proportional to the coefficient of friction between the tire and the ground. This information is sent to the memories 9 and 10 through the intermediary of the switch unit 8. This switch unit 8 is the device which regulates the sequences of charging, discharging and erasure of the memories 9 and 10. It is constituted by 8 switches (numbered from 1 to 8), the switches $8_1$ and $8_2$, and $8_4$ and $8_5$ being respectively coupled together rigidly in their movements.

The sequences of operation of the switches are adjusted in the manner shown in the following table:

ment has the advantage of not complicating the construction of the carrier unit by the addition of a feeler wheel. An arrangement of this kind comprises:

One or more wheels, for example four wheels 31, 32, 33 and 34, each equipped with a pneumatic tire and with a hydraulic brake 35, 36, 37 and 38;

One accelerometer 39, 40, 41 and 42 per wheel, enabling the acceleration and deceleration of the wheel to be measured, an adjusted resistance 43, 44, 45 and 46 being connected in the regulation circuit;

One servo-distributor 47, 48, 49 and 50 per wheel;

One switch unit 51 which is in turn composed:

(a) Of the control 52 of the sequences of charge, discharge and erasure of the memories 53 and 54 (this sequence control 52 corresponds exactly to the switch unit 8 already described;

(b) Of a feeler wheel change-over switch 55, made up of $2n$ switches (where $n$ is the number of wheels), the purpose of which is to confer the function of friction measuring to each of the wheels for a certain time, for example the time of a landing, in order to distribute the wear of the pneumatic tires uniformly over all the wheels;

(c) Of a switch 56 which pulsates the electric supply of the servo-distributor of the feeler wheel in such manner as to obtain on this wheel successive acceleration and deceleration;

T=ON position; R=OFF position (as shown in FIG. 1)

| Order of sequences | Switches | | | | | | | | Position 13 | Detector signal 7 | Sequences |
|---|---|---|---|---|---|---|---|---|---|---|---|
| | 1 | 2 | 3 | 4 | 5 | 6 | 7 | 8 | | | |
| Start: | | | | | | | | | | | |
| 1 | T | T | R | R | R | R | R | T | Exhaust | Acceleration | Charge 9. |
| 2 | R | R | R | T | T | R | T | R | Supply | Deceleration | Discharge 9. |
| 3 (1 cycle) | R | R | T | T | T | T | R | R | Exhaust | Acceleration | Discharge 9, charge 10. |
| 4 (1 cycle) | R | R | T | R | R | R | R | T | Supply | Deceleration | Discharge 10, erase 9. |
| 5 (1 cycle) | T | T | R | R | R | R | R | T | Exhaust | Acceleration | Discharge 10, charge 9. |
| 6 (1 cycle) | R | R | R | T | T | R | T | R | Supply | Deceleration | Discharge 9, erase 10. |

Figure 2:
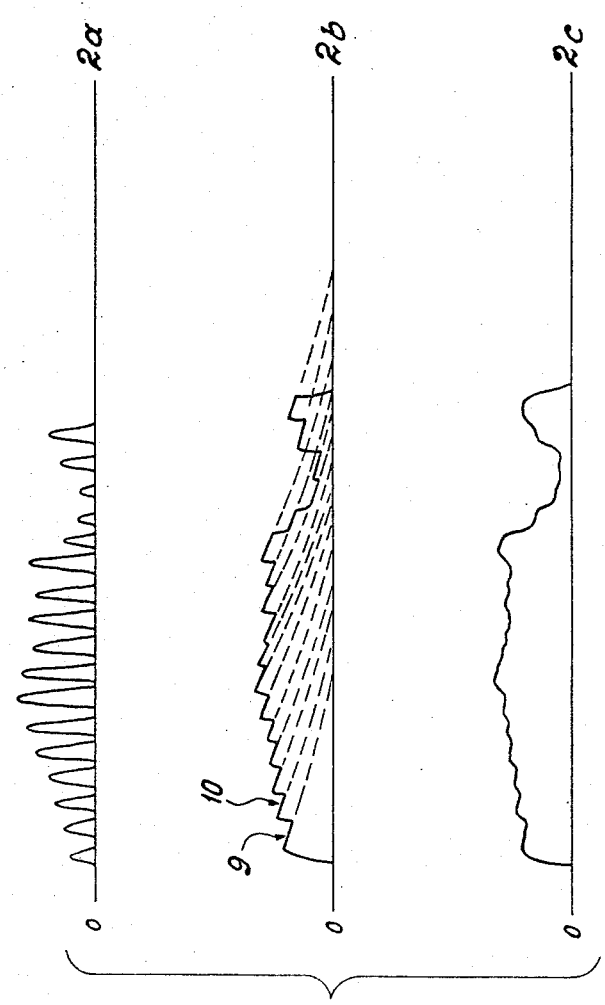
FIG. 2 shows the diagrams of the signals of acceleration, of discharges of the memories and of the braking pressure in the system shown in FIG. 1.

Again through the intermediary of the switch unit 8, the memories 9 and 10 are successively discharged into the servo-distributor 12 through an impedance matching device 11, the function of which is to prolong the discharge of the condensers which constitute the memories. The shape of the discharge curve of the memories is shown in FIG. 2, in which the diagram 2a represents the acceleration signals, the diagram 2b represents the charges and discharges of the memories 9 and 10, and the diagram 2c represents the braking pressure. The servo-distributor 12 thus sends a pressure which is continuous and variable in dependance on the accelerations measured by the feeler wheel, to the brake 2 of the wheel 1 and through the electro-distributor 13, which enables the pressure to be pulsated, to the brake 6 of the friction measuring device 5.

If for any reason whatever (abrupt variation of the state of the ground) the braking pressure applied to the brake 2 is greater than the braking capability determined (an instant previously) by the coefficient of friction between the tire of the wheel 1 and the ground, a regulation is effected by means of the decelerometer 3 which sends through the resistance 4 a current which is inverse and proportional to the deceleration, to the supply of the servo-distributor 12.

Figure 4:
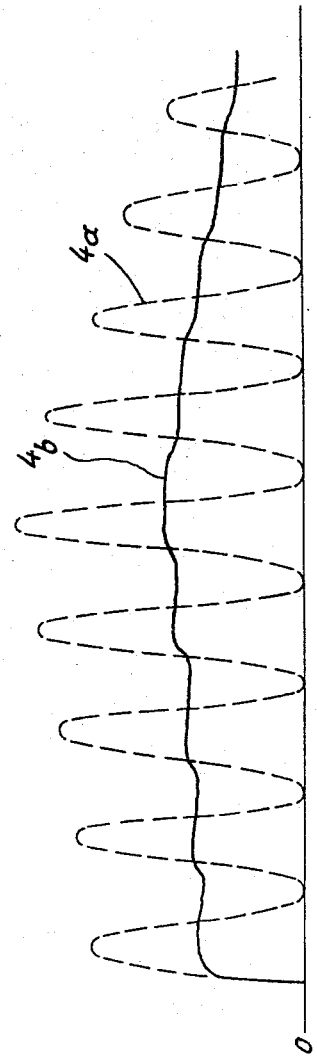
FIG. 4 shows the braking pressure diagrams of the friction measuring wheel and of the other wheels of the system shown in FIG. 3.

A braking device utilizing as a friction measuring device one of the wheels of the carrying unit will be described with reference to FIG. 3, which shows four wheels, this number being understood to be given by way of non-limitative example. In the case of a carrying unit with multiple wheels (in diabolo or in bogey), it is possible to use one of the wheels as a feeler wheel. This arrange- A group of two memories 53 and 54 constituted by an electric resistance-capacity circuit;

An impedance matching device 57;

An amplifier 58 mounted in the electric circuit supplying the servo-distributor of the feeler wheel. This amplifier 58 has the purpose of amplifying the current which is delivered from the impedance matching device 57, in order that the mean braking pressure which is pulsated on the brake of the feeler wheel, is identical to the mean continuous braking pressure applied to the brakes of the other wheels as shown in FIG. 4, which is a diagram of the pressure 4a (in chain-dotted lines) on the brake of the feeler wheel, and of the pressure 4b (in full lines) on the brakes of the other wheels: thus, there is no loss in braking efficiency on the feeler wheel.

Figure 3:
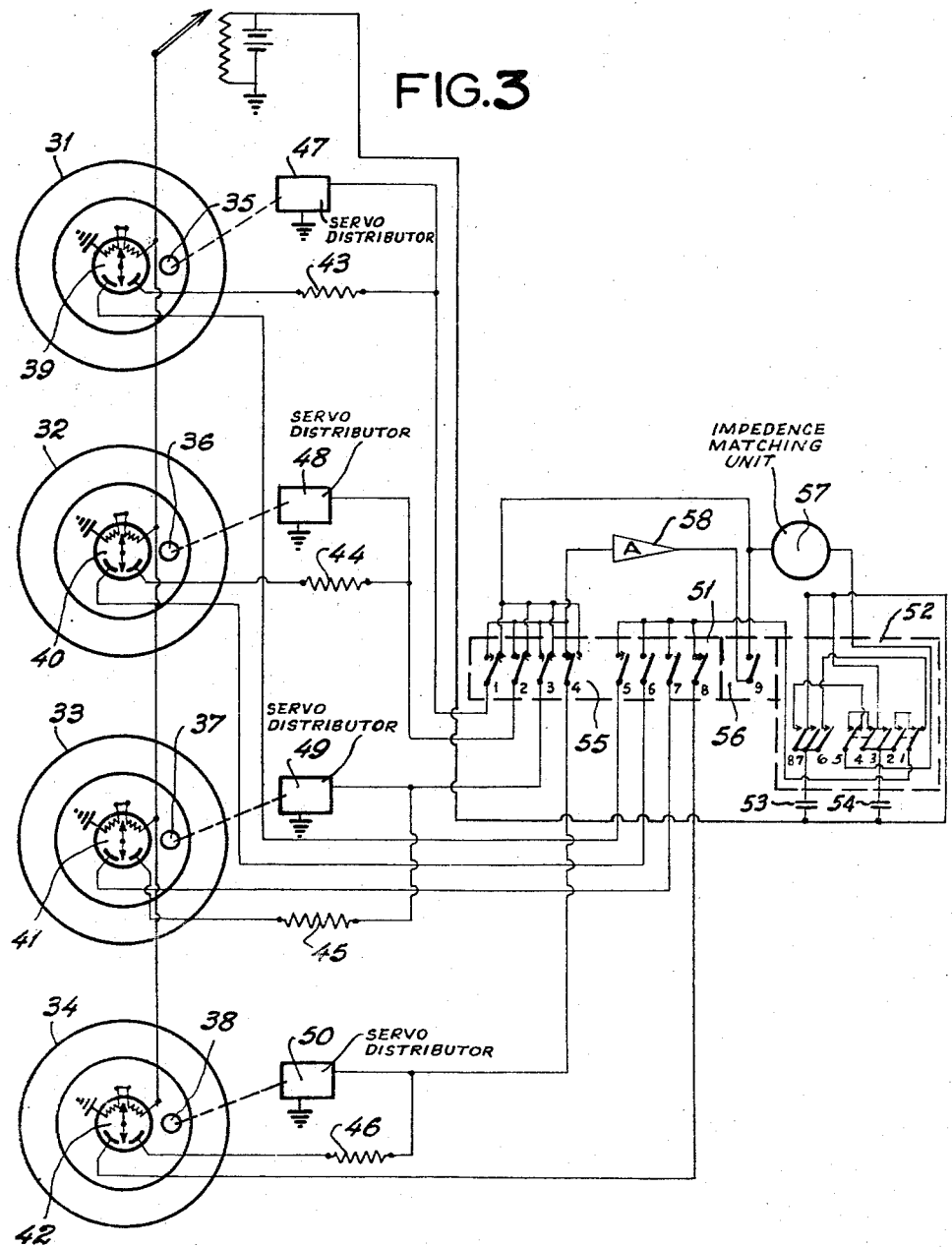
FIG. 3 represents the diagram of a braking system which utilizes one of the wheels of a unit as a feeler wheel.

The operation of the device is as follows (FIG. 3 represents a main bogey type aircraft landing gear with four wheels):

During the cycle shown, the wheel 34 is selected as a feeler wheel through the intermediary of the switches 4 and 8 of the change-over switch 55 of the switch unit 51. A first braking impulse being given by the pilot, the wheel 34 is alternately braked and released by the action of the switch 56.

As previously described, the successive accelerations measured by the accelerometer 42 charge the memories 53 and 54 through the intermediary of the sequence control 52, which also effects the restoration of the information and the erasure of the memories.

The current which is variable in dependence on the accelerations of the wheel 34 is sent directly through the impedence matching device 57 to the three servo-distributors 47, 48 and 49 supplying the brakes 35, 36 and 37 of the wheels 31, 32 and 33. The brake 38 of the feeler wheel 34 is supplied at the output of the impedence matching device 57 through the intermediary of the switch 56 and the amplifier 58.

If for any reason whatever (abrupt variation of the state of the ground, for example), one of the four wheels has a too large deceleration, this is measured by the accelerometer 39–42 which sends through the adjusted resistance 43–46 an inverse regulation current on the supply of the servo-distributor, thus producing a proportional pressure drop in the brake of the wheel concerned.

At the end of a certain number of cycles of braking and release of the feeler wheel, the change-over switch 55 acts and transfers the function of friction measurement to another wheel, the operation of the arrangement remaining unchanged.

What I claim is:

1. A system for controlling the hydraulic braking of the wheels of a vehicle, comprising a friction measuring wheel, means for periodically varying the braking and release of said friction measuring wheel in order to measure the acceleration of said friction measuring wheel during brake release and to control according to said measurement the value of the braking of the vehicle wheels said means comprising a switch unit constituted by a plurality of switches, an electro-distributor synchronized with said switch unit and adapted to vary the braking of said friction measuring wheel, an accelerometer on the friction measuring wheel, a decelerometer on each wheel of the vehicle, a servo-distributor for braking the wheels of the vehicle, and a group of two memories constituted by two resistance-capacity circuits, the resistance of which is part of the accelerometer of the friction measuring wheel, the capacitance of each memory being controlled by said switch unit and registering during the brake release of the friction measuring wheel the measurement supplied by the accelerometer on said friction measuring wheel and sending this measurement during the braking of said friction measuring wheel to the servo-distributor for braking the vehicle wheels, the decelerometer controlling said servo-distributor and reducing the braking effort in the event of skidding.

2. A system for controlling the hydraulic braking of the wheels of a vehicle, comprising means for causing each wheel to function successively as a friction measuring wheel by periodically varying the braking and release of such wheel in order to measure the acceleration of such wheel during the brake release and to control in accordance with said measurement the value of the braking of the other wheels of the vehicle, said means comprising a switch unit constituted by a plurality of switches, an accelerometer and a braking servo-distributor for each wheel, and a group of two memories constituted by two resistance-capacity circuits the resistance of which is included in the accelerometer of the selected friction measuring wheel, said switch unit being adapted to vary successively the braking pressure of each wheel, to register through the capacitance of each memory during the brake release of the wheel serving as friction measuring wheel the measurement supplied by the accelerometer of said wheel and to send by each memory during the braking of the wheel serving as a friction measuring wheel, the said measurement to the servo-distributors of the wheels, the accelerometer of each wheel controlling the servo-distributor of said wheel and reducing the braking effort in the event of skidding.

References Cited by the Examiner

UNITED STATES PATENTS

| | | | |
|---|---|---|---|
| 2,184,568 | 12/1939 | Stanffer | 303—21 |
| 2,249,868 | 7/1941 | Sorensen | 303—21 |
| 2,964,618 | 12/1960 | Robinson | 303—20 X |
| 3,188,463 | 6/1965 | Hines | 303—21 X |

EUGENE G. BOTZ, *Primary Examiner.*